May 30, 1961
C. H. SHATTUCK
2,986,122
REVOLVING PRESSURE CYLINDER
Filed Jan. 8, 1959
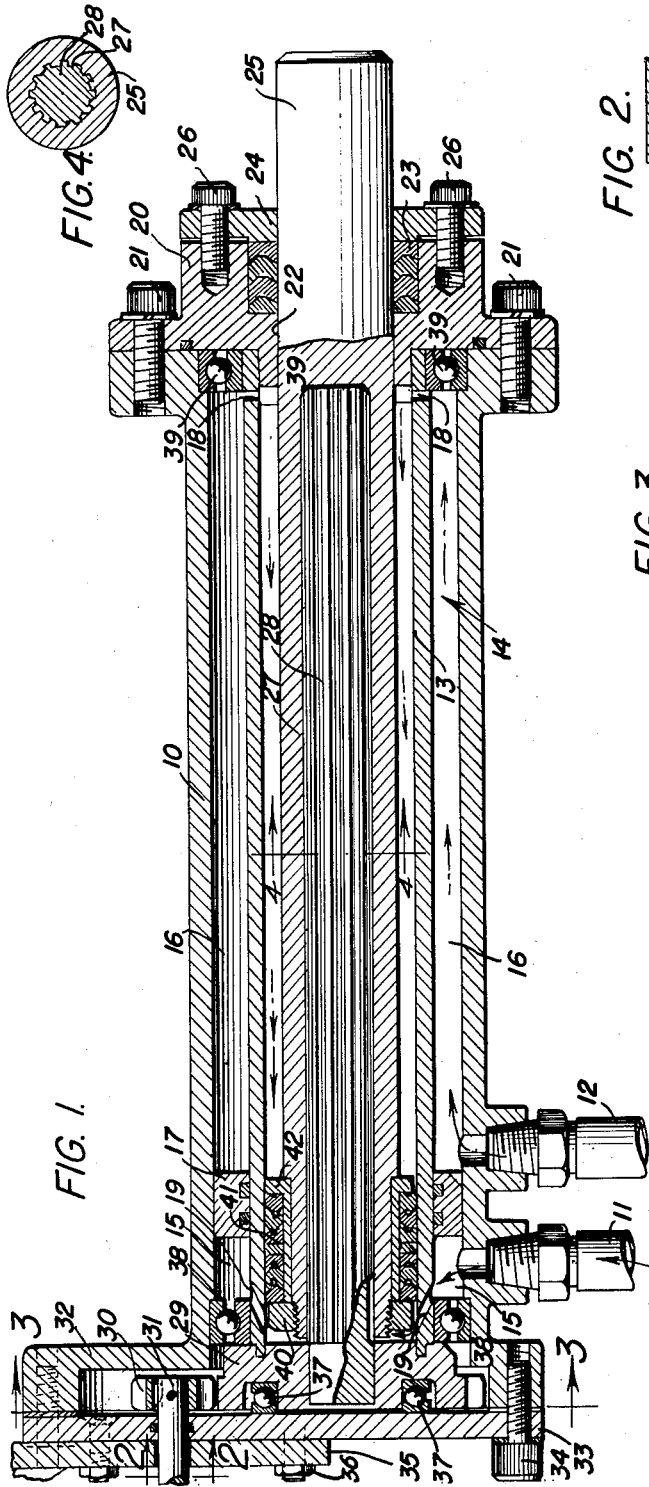
INVENTOR.
BY *Chauncey H. Shattuck*

United States Patent Office 2,986,122
Patented May 30, 1961

2,986,122

REVOLVING PRESSURE CYLINDER

Chauncey H. Shattuck, 3915 SE. 104th Ave., Portland 66, Oreg.

Filed Jan. 8, 1959, Ser. No. 785,674

2 Claims. (Cl. 121—38)

This invention relates to a drive mechanism, and more particularly to a revolving pressure cylinder.

The object of the invention is to provide a drive mechanism which is adapted to be used between an input shaft and a piston rod or output shaft so that the output shaft can be driven at a desired speed or torque wherein a means is provided for extending or retracting the output shaft or piston rod while the same is being rotated.

A further object of the invention is to provide a revolving pressure cylinder which includes an input shaft that can be driven or operated by a suitable power source, and wherein the output shaft can be used for operating any desired type of equipment or for furnishing power for different purposes, the present invention being constructed so that the output shaft can be rotated while it is in different positions.

A further object of the invention is to provide a revolving pressure cylinder that is extremely simple and inexpensive to manufacture.

Other objects and advantages will be apparent in the course of the following description.

In the accompanying drawing, forming a part of this application, and in which like numerals are used to designate like parts throughout the same.

Figure 1 is a longitudinal sectional view taken through the revolving pressure cylinder of the present invention.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is an elevational view showing the piston rod or output shaft in extended position, and showing a gear assembly connected thereto.

Referring in detail to the drawing, the numeral 10 indicates a hollow cylindrical housing which has fluid inlet and outlet conduits 11 and 12 connected thereto, Figure 1. A cylindrical casing 13 is arranged in the housing 10, and the casing 13 is spaced inwardly from the housing 10 so as to define a passageway 14. A circular partition 17 is arranged in the passageway 14 intermediate the conduits 11 and 12 so as to define spaced apart chambers 15 and 16. As shown in the drawing, there is provided in the casing 13 adjacent the edge thereof spaced apart ports 19 and 18 for the passage therethrough of fluid such as hydraulic fluid under pressure.

The numeral 20 indicates a head which is connected to an end of the housing 10 by means of securing elements or bolts 21, and the head 10 is provided with a central opening 22. The numeral 23 indicates packing which is retained in place in the head 20 by means of a plate 24, and a piston rod or output shaft 25 is mounted for sliding movement through the opening 22 in the head 20. The plate 24 is retained in place by means of securing elements 26.

The piston rod 25 is provided with a hollow interior that has a plurality of longitudinally extending splines 27, and the piston rod 25 is mounted for reciprocatory or sliding movement in the casing 13. The numeral 28 indicates a cylindrical shank or shaft which is provided with a plurality of longitudinally extending splines that are adapted to mesh with or coact with the splines 27 of the piston rod 25. The piston rod 25 is mounted for longitudinal sliding or shifting movement on the shaft 28.

The numeral 29 indicates a gear member which is secured to an end of the shank 28, and the pinion 30 has its teeth meshing with the teeth of the gear member 29, there being an input shaft 31 connected to the pinion 30. The input shaft 31 may be driven by any suitable power source such as a motor or the like.

The end of the housing 10 is shaped to include an enlarged shoulder 32, and a plate 33 is connected to the shoulder 32 by securing elements 34. The numeral 35 indicates an L-shaped bracket which is secured to the plate 33 as at 36, and the bracket 35 can be used for securing the assembly or device of the present invention to a suitable support structure.

The numerals 37, 38, and 39 indicate ball bearing assemblies which are provided adjacent the various moving parts so as to maintain friction at a minimum.

There is further provided a ring 40 which is arranged in the threaded engagement with an end of the piston rod 25, and packing 41 is arranged contiguous to the ring 40, the packing 41 being circumposed on a sleeve 42.

Referring now to Figure 5 of the drawing, it will be seen that the piston rod 25 can be operatively connected to a gear assembly which is indicated generally by the numeral 43, and the gear assembly 43 may be of a type that includes a frame 44. A bevel gear 45 is suitably connected to an end of the piston rod 25, and as the piston rod 25 rotates, the bevel gear 45 will be rotated so as to impart rotation to a pair of meshing bevel gears 46. The bevel gears 46 are connected to a shaft 47 which can be used for any desired purpose.

From the foregoing, it is apparent that there has been provided a drive mechanism wherein the input shaft 31 can be driven by any suitable power source, motor, or the like, and wherein the output shaft or piston rod 25 can be used for imparting rotary motion to any desired member or assemblies. Furthermore, the present invention permits the rod 25 to be moved to extended or retracted or any intermediate position so that the piston rod can be positioned at the required or desired location. For example it may be in the retracted position of Figure 1, or else the piston rod 25 can be in extended position as shown in Figure 5.

The operation is as follows:

As the shaft 31 is rotated, the pinion 30 will turn, and this causes rotation of the gear member 29. Since the gear member 29 is secured to the shank 28, the shank 28 will rotate, and due to the provision of the coacting splines on the shank 28 and piston rod 25, the piston rod 25 will thus be rotated. The shank 28 projects into the hollow recess in the piston rod 25 so that by supplying hydraulic fluid under pressure or other medium through the conduit 11, this fluid medium will enter the chamber 15 and then pass through the port 19 so as to engage the ring 40 and thus cause the piston rod 25 to move outwardly through the opening 22 in the head 20. When it is desired to return the piston rod 25 to retracted position, hydraulic fluid or the like can be introduced through the conduit 12 and this fluid will then enter the chamber 16 and then pass through the port 18 so as to return the piston rod 25 to retracted position. Even though the piston rod 25 is in extended or retracted position, the rod 25 will be continually rotated due to the intermeshing splines 27 and 28.

As shown in Figure 5 the piston rod 25 can be used for rotating shafts 47 through the intermeshing gears 45 and 46.

Suitable valves can be provided for controlling the flow of fluid through the conduits 11 and 12.

The parts can be made of any suitable material and in different shapes or sizes.

If desired a return spring can be used for assisting in the movement of the piston rod.

As shown in Figure 5 a bevel gear case may be attached to the end of the rod 25 for reciprocating at a 90° rotary motion and the shaft 47 can be rotated in either direction, and the rod 25 can be moved in or out.

The conduits 11 and 12 may be connected to a suitable source of material under pressure such as hydraulic fluid, air or the like, and the entire assembly may be supported on a suitable structure, mounting base, or other assembly. Suitable packing can be used wherever desired or required.

With the present invention the piston rod can be moved in or out and revolved at the same time so that any given length of stroke is possible. The input shaft 31 may be powered by any suitable drive mechanism such as an air, hydraulic or electric motor and various types of attachments can be fixed to the end of the rod 25.

The device can be used for engaging a clutch with predetermined pressure and drive, and it can also be used on a drill press so that the more pressure required to push, the slower the drive so that there will be needed a small drill for high speed low pressure on the push stroke, and a large drill or more push for slow speed. Furthermore, if the device is used on a hone or similar device, suitable valves can be used to establish a cyclic operation so that the piston rod can be moved back and forth while rotating at a given r.p.m. The stroke of the piston can be in any length and the reduction between the input and output shafts can be at any ratio and the pushing force of the piston rod can be any number of pounds. Furthermore, suitable seals, bushings, and pressure fittings can be used as desired or required for single or double acting cylinders.

Minor changes in shape, size and rearrangement of details coming within the field of invention claimed may be resorted to in actual practice, if desired.

I claim:

1. In a device of the character described, a hollow cylindrical housing, fluid inlet and outlet conduits connected to said housing, a cylindrical casing arranged within said housing and spaced inwardly from said housing to define a passageway, a circular partition arranged in said passageway and positioned intermediate said fluid inlet and outlet conduits so as to define spaced apart chambers, there being spaced apart ports adjacent each end of said casing, said ports communicating with said chambers, a head connected to an end of said housing, a piston rod slidably mounted in said casing and projecting through said head, said piston rod including a hollow interior which is provided with longitudinally extending splines, and a cylindrical shank projecting into the hollow interior of said piston rod and provided with longitudinally extending splines for coaction with the splines of said piston rod.

2. In a device of the character described, an input shaft, a piston rod arranged for rotary and reciprocatory movement, means operatively connecting said piston rod to said input shaft, said means comprising an intermeshing pinion and gear member, and a shank having a plurality of spaced apart longitudinally extending splines for coaction with longitudinally extending splines on the piston rod.

References Cited in the file of this patent

UNITED STATES PATENTS

| | | |
|---|---|---|
| 2,371,607 | Collins | Mar. 20, 1945 |
| 2,639,014 | Munschauer | May 19, 1953 |
| 2,661,807 | Fielding | Dec. 8, 1953 |
| 2,740,512 | Fischer | Apr. 3, 1956 |
| 2,835,227 | Gamet | May 20, 1958 |
| 2,880,009 | Gamet | Mar. 31, 1959 |